United States Patent [19]

Greve et al.

[11] 4,159,302
[45] Jun. 26, 1979

[54] FIRE DOOR CORE

[75] Inventors: Dale R. Greve; Turner W. Richards, both of Beaverton, Oreg.

[73] Assignee: Georgia-Pacific Corporation, Portland, Oreg.

[21] Appl. No.: 868,037

[22] Filed: Jan. 9, 1978

Related U.S. Application Data

[63] Continuation of Ser. No. 622,259, Oct. 14, 1975, abandoned.

[51] Int. Cl.² ................... B28B 3/00; B32B 13/10; B32B 13/12
[52] U.S. Cl. ................................. 264/333; 106/90; 106/97; 106/99; 106/DIG. 2; 428/920; 428/537; 428/538
[58] Field of Search ............... 106/89, 90, 94, 97, 106/99, 111, 116, DIG. 2; 156/71; 264/333; 428/310, 314, 446, 448, 320–322, 920, 921

[56] References Cited

U.S. PATENT DOCUMENTS

| 3,203,813 | 8/1965 | Gajardo et al. | 106/40 |
| 3,372,040 | 3/1968 | Ware | 106/15 |
| 3,502,490 | 3/1970 | Ware | 106/15 |
| 3,565,650 | 2/1971 | Cordon | 106/97 |
| 3,847,633 | 11/1974 | Race | 106/98 |
| 3,853,689 | 12/1974 | Morrone | 156/39 X |
| 4,067,939 | 1/1978 | Lowe et al. | 264/42 |

*Primary Examiner*—George F. Lesmes
*Assistant Examiner*—Bruce H. Hess
*Attorney, Agent, or Firm*—John T. Synnestvedt; Kenneth P. Synnestvedt

[57] ABSTRACT

A fire door core in which the major ingredient is expanded perlite and including, as minor ingredients, set gypsum, set hydraulic cement and an organic binder, and having a density of no greater than about 30 lbs. per cubic foot, and preferably including unexpanded vermiculite, clay, and fibrous reinforcements, and a process for making said fire door core, and also a fire door including said core.

7 Claims, 3 Drawing Figures

FIG. 1.

FIRE DOOR CORE

This is a continuation of application Ser. No. 622,259, filed Oct. 14, 1975, now abandoned.

FIELD OF THE INVENTION

This invention relates to a fire resistant composition which is particularly suited for use as a fire door core.

The use of fire doors in buildings is an important factor in avoiding injuries and loss of lives and in preventing property damage as a result of their ability to deter the spread of fire. In the interest of public safety, standards have been set by governmental agencies, building code authorities, insurance companies, and builders' and manufacturers' associations for the installation and performance of door assemblies which retard the passage or spread of fire. Building codes require that fire resistant door assemblies be installed in wall openings and that such assemblies pass standard and industry-wide accepted tests which are an evaluation of the fire resistant properties of the door assembly.

A conventional fire door is a wood composite type which comprises a manufactured fire resistant core which is encased in a wood frame and veneer comprising either wood or plastic that is not fire resistant. The wood composite door must have certain basic properties in order to meet accepted standards and pass industry-wide accepted fire endurance tests of door assemblies in accordance with ASTM E-152. In these tests, the door and frame are exposed to intense heat such as that generated by fire in a burning building. Exemplary conditions of such tests involve exposing the door assembly to temperatures which progressively increase within the range of 1750° to 1800° F. for an exposure period up to 1½ hours. Basic properties that must be possessed by door cores during exposure to such tests are discussed below.

The door core must have good integrity during exposure to fire, that is, it must resist burning, melting, spalling, cracking or deteriorating in any way which would cause the temperature on the side of the door not exposed to the fire to rise to the extent that the combustible veneer on the unexposed side of the door burns or chars substantially.

During exposure to heat, the core must have good dimensional stability properties. It must remain relatively stable and resist warping or shrinking to the extent that it remains in contact with wood edge banding (stiles and rails) around its perimeter. Separation from the wood banding can cause the wood to burn away prematurely, allowing fire to penetrate the opening.

In addition, the core must be resistant to heat transmission so that the transfer of heat from the fire-exposed side of the door to the unexposed side is deterred. Otherwise, there would be ignition and possible spread of fire as a result of premature charring or burning of the combustible veneer of the unexposed side of the door.

Another characteristic required of the core is that it must retain its integrity when exposed to a hose stream. Immediately after the fire endurance test is completed, the door is removed from the furnace and subjected to the impact, erosion and sudden cooling effects of a hose stream. The core must retain its integrity under the pressure of the hose stream. Good water resistance is a necessary property for this to be accomplished.

In addition to possessing the above-mentioned properties, fire door cores must, in order to be commercially acceptable, also have other properties that are related to the manufacture, installation and service of the fire resistant door.

For example, the door core must have machineable properties which permit it to be sawed, sanded and edge profiled. In a typical manufacturing process, the core is sawed to size, a tongued edge profile is applied and the core is sanded to desired thickness.

The core should also be capable of being well bonded by adhesive or glue to veneers such as those comprising wood or plastic materials. This generally requires that the core have properties which permit the glue to soak into the core so that a deep strong bond is obtained, as opposed to a surface bond which is apt to be weak. Also, the core should have sufficiently good water resistance so as to resist being weakened and crushed in applications where water-based glues are used in laminating the veneer to the core.

Additionally, the door core should be relatively light in weight. The lighter the core the easier to handle it and the door assembly, and the less the freight cost for shipping either the core or the fire door itself. There is also less strain on the hinges of an installed door which is light in weight.

The core should also have sufficient flexural and compressive strength to permit normal handling that is entailed in processing, shipping and assembling the door. The finished door must have sufficient impact resistance to prevent being damaged when opened and closed when the door is in service.

It is important also that the core have sufficiently good dimensional stability so that no significant changes in dimensions or warpage occur during shipment, storage and use under varying temperature and humidity conditions.

It is preferred also that the door be manufactured from as few core pieces as possible. At one time, fire doors were assemblied from a plurality of core pieces. Presently, full sized, one-piece cores (for example, 3' by 7') are available. And industry has become used to the manufacturing convenience of assembling the door from a one-piece core inasmuch as this eliminates the extra time involved in assembling the door from a plurality of pieces of core.

This invention relates to a development which affords the making of fire door cores which have the fire resistant properties and other physical properties demanded of a commercially acceptable product.

REPORTED DEVELOPMENTS

Fire door cores have been made from various types of compositions. As will be seen from the discussion which follows, heretofore known cores or the manufacturing process for making them have certain undesirable characteristics.

It is believed that at the present time the most widely used fire door cores are based on the use of calcium silicate. In general, such cores also contain asbestos and in some cases, also Portland cement (see U.S. Pat. Nos. 2,593,050 and 2,469,379). The manufacture of such calcium silicate-based cores is relatively expensive in that autoclaving is involved and this requires relatively high capital investment in equipment and the use of relatively high amounts of energy. Furthermore, safety and environmental problems are encountered in the use of the asbestos ingredient.

Various developments have been reported concerning the use of gypsum-based compositions which are reported to have good fire resistant properties. For example, see U.S. Pat. No. 3,376,147 (gypsum, unexpanded vermiculite, unexpanded perlite and glass fibers); U.S. Pat. No. 3,454,456 (gypsum, unexpanded vermiculite of a specified particle size, fibrous reinforcements and optionally boric acid); U.S. Pat. No. 3,502,490 and related U.S. Pat. No. 3,372,040 (gypsum or Portland cement or a mixture thereof, natural occurring phosphate rock and lime, and optionally, expanded vermiculite or expanded perlite or a mixture thereof, and organic adhesive binder, surfactant and clay); and U.S. Pat. No. 3,616,173 (gypsum, unexpanded vermiculite, glass fibers and either clay, colloidal silica or colloidal alumina). The emphasis in the aforementioned patents is on the use of the compositions described therein in the manufacture of fire resistant wallboard or plaster. In general, the fire reistant accepted criteria of gypsum wallboard are not as stringent as those required of fire doors.

A gypsum fire door core that has been commercially available is believed to have included, in addition to gypsum, sisal fibers, expanded perlite and an organic binder such as polyvinyl acetate. A serious disadvantage of such cores is that they have a relatively high density, for example, in the neighborhood of about 35 pounds/cubic foot.

It is an object of this invention to provide a light weight fire door core and particularly one that is capable of being manufactured according to simple and inexpensive techniques.

SUMMARY OF THE INVENTION

In accordance with this invention, there is provided a fire door core in which the major ingredient is expanded perlite and which also contains, as minor ingredients, set gypsum, set hydraulic cement and a binder, and wherein the density of the core is no greater than about 30 pounds per cubic foot.

In preferred form, the fire door core contains an organic binder, most preferably polyvinyl alcohol (polyvinyl acetate which is substantially fully hydrolyzed), and also several other ingredients, namely, unexpanded vermiculite, clay and fibrous reinforcements, most preferably chopped glass fibers.

In accordance with the invention, the fire door core is made by: (A) admixing expanded perlite, calcined gypsum, hydraulic cement and binder, and additives which may be used also, in the presence of an amount of water no greater than that needed to provide a damp mixture of the ingredients, but at least sufficient in amount to set the calcined gypsum and hydraulic cement; and (B) compression-molding the damp mixture into the desired shape, density and thickness or to a thickness greater than, but approximating that desired.

The present development affords the means for making fire door cores having a relatively low density and the combination of properties required for a core to be commercially acceptable, including particularly fire resistant properties which permit fire door assemblies including the core to pass standard fire endurance tests and to meet building code specifications. In addition, the fire door core can be made in a manufacturing process which requires a relatively low capital investment for equipment and which utilizes relatively simple process steps.

DETAILED DESCRIPTION OF THE INVENTION

The ingredient in the set core which is present in an amount greater than any other of the ingredients comprising the set core is expanded perlite, a glass-like material. Speaking generally, expanded perlite can be formed by heating moisture-containing, nautral-occurring perlite ore at a temperature within the range of about 1,500° to 2,000° F. Such heat treatment explodes or expands the perlite to, for example, 15–20 times its original volume. Commercially available forms of expanded perlite known as cryogenic, plaster and concrete aggregate are exemplary of materials that can be used in the practice of the present invention.

The particle size of the expanded perlite can vary over a wise range. Expanded perlite having a particle size distribution as set forth below is exemplary.

| Mesh (U.S. Standard Sieve Series) | % Retained |
|---|---|
| 30 | 24 |
| 50 | 73 |
| 100 | 93.5 |

It should be understood that expanded perlite of different particle size distribution can be used in the practice of the present invention.

The expanded perlite functions as a non-combustible compactible filler which imparts light weight to the set composition, and also relatively high strength as compared to other means which could be used to impart light weight to the set composition, for example, such as by introducing air voids into the set composition by foaming the mixture of ingredients from which the set composition is made.

To optimize strength properties of the core, those forms of expanded perlite which are more resistant to being compressed or compacted than other forms are used. It has been observed that various forms of perlite are less spongy than others. The less spongy the perlite, the greater its resistance to being compressed and the greater the strength of the core. Conversely, the more spongy the perlite, the more readily it is compressed and the lower the strength of the core.

There follows a detailed description of a method by which the compressibility or compactibility properties of expanded perlite can be evaluated. Apparatus used in the evaluation is described below:

(A) a cylindrical mold having an inside diameter of 1.8125", a length of 5" and a wall thickness of ⅛";
(B) a plunger having an outside diameter of 1.8100" and a length of 6½" and which slip-fits into the aforementioned cylindrical mold;
(C) an aluminum block 4"×4"×½"; and (D) a conventional hydraulic testing machine.

In evaluating the compressibility properties of expanded perlite, the plunger is inserted in one of the open ends of the mold and a 10 gram sample of expanded perlite is placed in the mold. The aluminum block is then placed on the other end of the mold and the entire assembly is placed in the hydraulic testing machine. The speed of the head of the hydraulic testing machine is maintained at 1.5"/minute as the head forces the plunger into the mold until the sample of perlite is compressed to 1" at which time the pressure reading on the testing machine is recorded. The compressibility (C) of the perlite is calculated by dividing the pressure (in pounds) needed to compress the 10 gram perlite sample to 1" by the area of the face of the plunger (2.6 sq. "). Table 1 below sets forth the compressibility properties and densities of various types or grades of expanded perlite.

TABLE 1

| Sample | Expanded Perlite | C, lb/sq." | Density, 16/cu.ft. |
|--------|------------------|------------|---------------------|
| A | cryogenic | 115 | 5.5 |
| B | " | 108 | 5.6 |
| C | " | 100 | 3.4 |
| D | " | 92 | 6.5 |
| E | horticulture | 85 | 9.6 |
| F | tailings (fine) | 69 | 9.7 |
| G | cryogenic | 69 | 10.3 |
| H | plaster | 62 | 8.2 |

Cores having particularly good strength properties can be prepared from expanded perlite which has a compressibility of at least about 90 lb/sq.". Preferred expanded perlite for use in the practice of the present invention has a compressibility of at least about 90 lb/sq." as determined by the method of evaluation described hereinabove.

The set composition comprises also set gypsum, that is, calcium sulphate dihydrate. The set gypsum is formed by the recrystallization of calcined gypsum with water. Calcined gypsum is in general produced by driving off water of hydration present in naturally-occurring gypsum (calcium sulphate dihydrate) through the use of heat. Depending on the degree of calcination, there is produced calcium sulfate hemihydrate ($CaSO_4 \cdot \frac{1}{2}H_2O$) or other form of calcium sulfate which is capable of hydrating with water to form set gypsum. The calcined gypsum is conveniently used in powdered form.

Another of the essential ingredients used in the core is hydraulic cement, a material which reacts with water to form a hardened product. Various types of hydraulic cements can be used including those occurring in nature. Examples of hydraulic cements include Portland cement, cements containing a high content of aluminates and characterized by their rapid hardening properties, pozzolanic cement, cements characterized by their high content of calcium silicates, and cement from deposits in the Lehigh Valley, Pennsylvania. Mixtures of different cements can be used also. Portland cement is readily available and excellent results have been achieved using this relatively inexpensive cement. It is preferred that the core be prepared from Type III Portland cement.

The set hydraulic cement imparts to the core good water resistant properties and high compressive strength. Accordingly, the set hydraulic cement aids greatly in maintaining the integrity of the core when it is exposed to the wetting and the pressure of a hose stream. In addition, the set hydraulic cement functions as shrink resistant material in the core when it is exposed to fire.

The use of an organic binder in the set core of the present invention is necessary to achieve desired flexural and compressive strength and general handling characteristics. Desired strength characteristics can be achieved without the use of the organic binder and by using relatively high amounts of gypsum and/or cement. However, this increases the density of the product. The organic binder can be a naturally-occurring material or a synthetic material. Examples of the former include starches, dextrins and gums. Examples of synthetic materials are resins such as polyvinyl alcohol, polyvinyl acetate, polymers of vinyl acetate and ethylene, polymers of styrene and butadiene, and acrylic resins.

The organic binder is typically a material which is dispersible or soluble in water. The preferred organic binder is polyvinyl alcohol, a well known commercially available material. Speaking generally, polyvinyl alcohol is prepared by hydrolyzing polyvinyl acetate. The source of the polyvinyl alcohol is preferably a substantially completely hydrolyzed form of polyvinyl acetate, that is, about 97 to 100% hydrolyzed polyvinyl acetate. The polyvinyl alcohol is cold-water insoluble. Solutions can be prepared at elevated temperatures, for example, at temperatures of about 140° to 205° F. In general, a 4 wt. % water solution of polyvinyl alcohol at 20° C. will have a viscosity of about 25 to about 70 cp as determined by means of the Hoeppler falling ball method. Commercially available polyvinyl alcohols for use in the composition of the present invention are available from E. I. du Pont de Nemours and Company, sold under the trademark "Elvanol" and from Monsanto Co., sold under the trademark "Gelvatol". Examples of such products are Elvanol, Grades 90–50 G, 71-30, 72-60 and 70-05, and Gelvatol, Grades 1-90, 3-91, 1-60 and 3-60.

In preferred form, the fire door core is prepared from several additional ingredients, namely, unexpanded verimculite, clay and fibrous reinforcements.

The vermiculite component that is used in preparing the fire door core is comminuted unexpanded vermiculite. This ingredient contributes fire resistant properties to the set composition and counteracts its tendency to shrink at elevated temperatures thereby imparting improved dimensional stability properties to the set composition during exposure to heat. As is known, unexpanded vermiculite expands upon being heated. Such expansion tends to compensate for the tendency of the core to shrink at elevated temperatures as a result of sintering of materials comprising the core. For example, set gypsum tends to shrink as its chemically combined water is driven off by heat.

Ideally, the amount of unexpanded vermiculite used in the composition should be such that when it expands, its expansion will substantially equal the shrinkage of the set gypsum. The specific amount of vermiculite necessary to achieve this will depend on various factors, including the specific amount of set gypsum in the core and the expansion properties of the specific vermiculite used. It is known that the expansion properties of vermiculite tend to vary, depending on its particle size and the source of the vermiculite, that is, the geographical area in which it is mined. For example, vermiculite from different sources tends to expand to varying degrees. Also, regardless of the source of the vermiculite, it tends to expand to varying degrees depending on its degree of comminution. Accordingly, the aforementioned factors should be taken into account in preparing a set core in which it is desired that the vermiculite expand to the extent that its expansion substantially equals the shrinkage of the set gypsum. By way of example, it is noted that excellent results have been achieved by using about 7 wt. % of vermiculite based on the amount of set gypsum in the core when the source of vermiculite is from the mines of Libby, Mont. and is of −28 mesh (U.S. Standard Sieve Series). Such vermiculite is referred to herein as "high grade". It should be understood that vermiculite from other sources and of different particle size can be used.

It should be understood that improvements can be realized by using an amount of vermiculite below that referred to above. The use of an excessive amount of vermiculite will tend to result in a degree of expansion which causes cracking or spalling of the core's surface.

The use of clay imparts to the set core improved fire resistant and high temperature, dimensional stability properties. Broadly speaking, clays are natural, earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics are included within the term "clay" as used herein.

Examples of the types of clay that can be utilized are: bentonite—comprised mainly of the clay mineral montmorillonite; attapulgite—clays which contain magnesium aluminum silicates; and kaolinitic clays—including, for example, kaolin (also referred to as china or paper clays), ball clay, fireclay, and flint clay, which clays are comprised predominantly of the clay mineral kaolinite. Other of the various types of clays which contain mixtures of various proportions of clay minerals, such as for example, illite, chlorite, kaolinite and montmorillonite, as well as non-clay materials, may also be used.

Preferred clays for use in the practice of the present invention include kaolinite, attapulgite and bentonite.

Fibrous reinforcements impart flexibility and impact-resistant properties to the set composition, and also better handling properties in that resistance to cracking or breakage during shipment or processing is improved. Glass fibers are preferred. Examples of other fibrous reinforcements that can be substituted for glass fibers or used in combination therewith are sisal fibers, asbestos, graphite, and synthetic fibers such as, for example, rayon and polyacrylonitrile.

As to amounts of ingredients utilized in the practice of the present invention, the set composition comprises the set product of an aqueous mixture, based on the total weight of the dry ingredients in the mixture, of:

(A) about 50 to about 70 wt. % of expanded perlite;
(B) about 10 to about 30 wt. % of calcined gypsum;
(C) about 10 to about 20 wt. % of hydraulic cement;
(D) about 1 to about 5 wt. % of an organic binder;
(E) 0 to about 4 wt. % of unexpanded vermiculite;
(F) 0 to about 4 wt. % of clay; and
(G) 0 to about 1 wt. % of fibrous reinforcements.

In preferred form, the aforementioned aqueous mixture includes:
(A) about 50 to about 55 wt. % of said perlite;
(B) about 20 to about 25 wt. % of said gypsum;
(C) about 10 to about 15 wt. % of said cement;
(D) at least about 1.5 wt. % of said organic binder;
(E) at least about 1.5 wt. % of said vermiculite;
(F) at least about 1.5 wt. % of said clay; and
(G) at least about 0.2 wt. % of said fibrous reinforcements.

With respect to the amounts of vermiculite set forth, various of the factors discussed hereinabove should be taken into account in selecting the specific amount of vermiculite to use.

The mixture from which the set core is made contains also water in an amount at least sufficient to provide the stoichiometric amount of water needed to cause the setting of the calcined gypsum and hydraulic cement. It is generally expedient to include an amount of water in excess of the stoichiometric amount. For ease of manufacture, it is preferred that the amount of water be no greater than that needed to provide a damp mixture of the ingredients. Higher amounts of water can be used, for example, amounts which produce a slurry of the ingredients. However, the set core can be produced more readily from a damp mixture of the ingredients than from a slurry thereof. The set core can be prepared readily from about 25 to about 60% of water based on the weight of the dry ingredients comprising the mixture.

In addition to the aforementioned ingredients, other additives may be used for special purposes. Examples of such additives include antifoam agents, wetting agents, retarders and coloring pigments. As will be described more fully below, dust collected from finishing operations performed on the dried core can also be used in preparing the cores of the present invention.

Set cores within the scope of the present invention can be prepared having a compressive strength of at least about 200 lbs/sq.in. and ranging up to about 400 lbs/sq.in. Furthermore, set cores which are relatively light in weight can be produced. For example, set cores having a density within the range of about 22 to about 30 pounds/cubic foot and having required fire resistant properties can be manufactured. It should be understood that set compositions of greater density can be produced also from the ingredients described above.

As will be described more fully below, the preferred method for preparing the core of the present invention involves mixing the ingredients with an amount of water no greater than that required to provide a damp mixture of the ingredients and then molding and compressing the damp mixture to form the core. It is preferred that the ingredients be mixed in a manner such that breakdown or fracturing of the expanded perlite is minimized. Breakdown of the expanded perlite prior to its being compressed adversely affects the strength of the core. It is noted that the expanded perlite constitutes most of the volume of the mixture of ingredients.

Accordingly, the effectiveness of the mixing step with respect to minimizing breakdown of the unexpanded perlite can be determined by comparing the volume of the mixture at the start of mixing with the mixture's volume after mixing is terminated. Preferred and effective mixing is accomplished when the volume of the mixture at the start of mixing is substantially the same as when mixing is terminated.

In preferred form, the set composition or core is prepared as follows. The hydraulic cement and calcined gypsum are admixed initially and then combined with the expanded perlite and water as all of the ingredients are mixed thoroughly. Mixing the perlite with the other solid ingredients after they have first been mixed allows the perlite to be thoroughly blended into the mixture with a minimum of mixing. This is advantageous because it minimizes fracturing or breakdown of the perlite.

When utilizing an organic binder, it may be incorporated in the water which is added to the other ingredients in an amount at least sufficient to provide the water necessary to set the calcined gypsum and cement, and preferably in an amount no greater than that necessary to provide a damp mixture of the ingredients. Other ingredients such as unexpanded vermiculite, clay and fibrous reinforcements are mixed preferably with the hydraulic cement and calcined gypsum prior to the addition of the expanded perlite and water. Thorough mixing of the ingredients has been accomplished in a paddle type mixer by mixing for about 25 to about 40 seconds.

After the ingredients are mixed thoroughly, the damp mixture is transferred to an open-top mold having a shape corresponding to that desired of the set composition. The damp mixture is then compression molded to compact the mixture to the desired density and thickness or a thickness somewhat greater than desired of the finished core. Excellent results have been obtained by compressing the damp mixture to about 25 to about 33% its original volume utilizing pressures within the range of about 90 to about 120 psi for about 15 to about 25 seconds. As the mixture is compressed, the expanded perlite is compressed to a significant degree.

One of the important characteristics of the present development is that immediately after the damp mixture has been compressed, its green strength is such that it is shape-retaining and it resists being damaged by handling. This allows the core to be removed promptly from the mold. Exemplary compression strengths of the freshly compressed core are within the range of about 50 to about 100 psi. It is believed that the green strength of the core is due to partial setting of the calcined gypsum and compression of the mixture. Although drying of the core can be accomplished at room temperature, it is preferred to accelerate drying by the use of heat. This can be accomplished by placing the core in an oven having a temperature within the range of about 150° to about 300° F. for a period of time within the range of about 4 to about 8 hours. It should be understood that the time during which the core remains in the heated environment will depend on the temperature thereof.

Following the above method, it is possible to prepare a finished core within a relatively short period of time, for example, within about 4 to about 8 hours from the time the ingredients are combined for mixing.

After the core has been dried, finishing operations can be effected. For example, the core can be sanded to a thickness within the required tolerance, sawed or shaped as desired. The nature of the dried material is such that finishing operations can be performed readily.

During the course of finishing operations such as sanding and sawing, core dust is produced. In accordance with this invention, it has been found that the dust can be used in preparing other cores by including it in the mixture from which the core is made. This is highly advantageous because it makes use of a material which would otherwise be waste requiring disposal. The use of core dust increases the density of the core. Accordingly, the maximum amount of core dust used will be governed by the desired density of the core. It is recommended that the core dust comprise no more than about 6 wt. % of the total weight of the dry mixture of ingredients. Preferably, the core dust comprises about 2 to about 4 wt. % of the mixture.

It should be understood that the method described above for preparing the core is a preferred method and that other process steps can be used to prepare the core. For example, it is possible to prepare the core in a continuous operation using ingredients metered into a continuous mixer.

A method for preparing a fire door core within the scope of the present invention is described below in connection FIG. 1.

Gypsum, Portland or other hydraulic cement, vermiculite, clay, and chopped glass fibers or other fibrous reinforcements are mixed thoroughly in mixer 2 and fed to mixer 4 into which there is also fed perlite from container 6 and an aqueous dispersion or solution of polyvinyl alcohol or other organic binder from container 8. All of the ingredients are mixed thoroughly in mixer 4. The water required to set the calcined gypsum and hydraulic cement is available from the aqueous dispersion or solution of the organic binder and is added in an amount such that a damp mixture of ingredients is obtained. After thoroughly mixing the ingredients in mixer 4, the damp mixture 13 is fed to mold 10. The mold 10 is then transferred to a pressing station 12 where the mixture 13 is compressed by press member 14 into the desired shape and density and to a thickness greater than, but approximating that desired.

Promptly after the mixture has been compressed, the formed core 15 is removed from the mold and transferred to cart 16 where it is supported on rollers 18. As mentioned above, one of the important characteristics of the freshly compressed core is that it has a sufficiently high green strength to permit it to be handled in the manner described without damage.

After loading the cart 16 with formed cores, the cart is wheeled to a drier 20 where the cores are dried and setting of the calcined gypsum and hydraulic cement is effected. The cores should be allowed to dry to the extent that their free moisture content is about 0.1 to about 1.5 wt. %.

After the cores have dried to the desired extent, they are transferred to sanding station 22. Sanding rollers 23 smooth the top and bottom surfaces of the core 15 and impart a substantially uniform thickness to the core and a thickness which is within the desired tolerance. It is often necessary to sand only one surface of the core.

Figure 1:
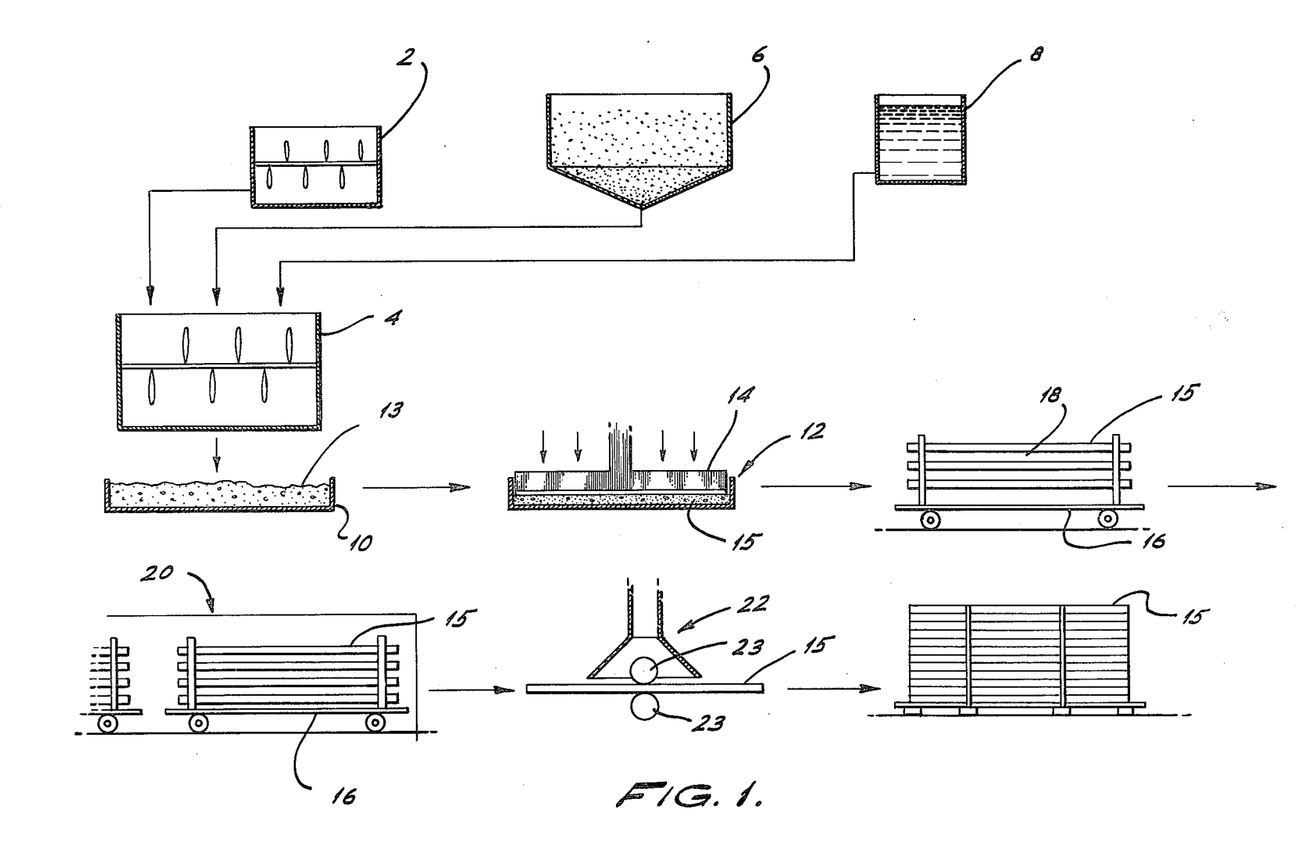
FIG. 1 is a flow diagram of a process for manufacturing a fire door core of the present invention.

After the sanding operation is completed, the cores can be stacked for shipment, as shown in FIG. 1, to manufacturers who incorporate the cores into fire doors. As an alternative, the doors can be assembled at the core manufacturing site.

Figure 2:
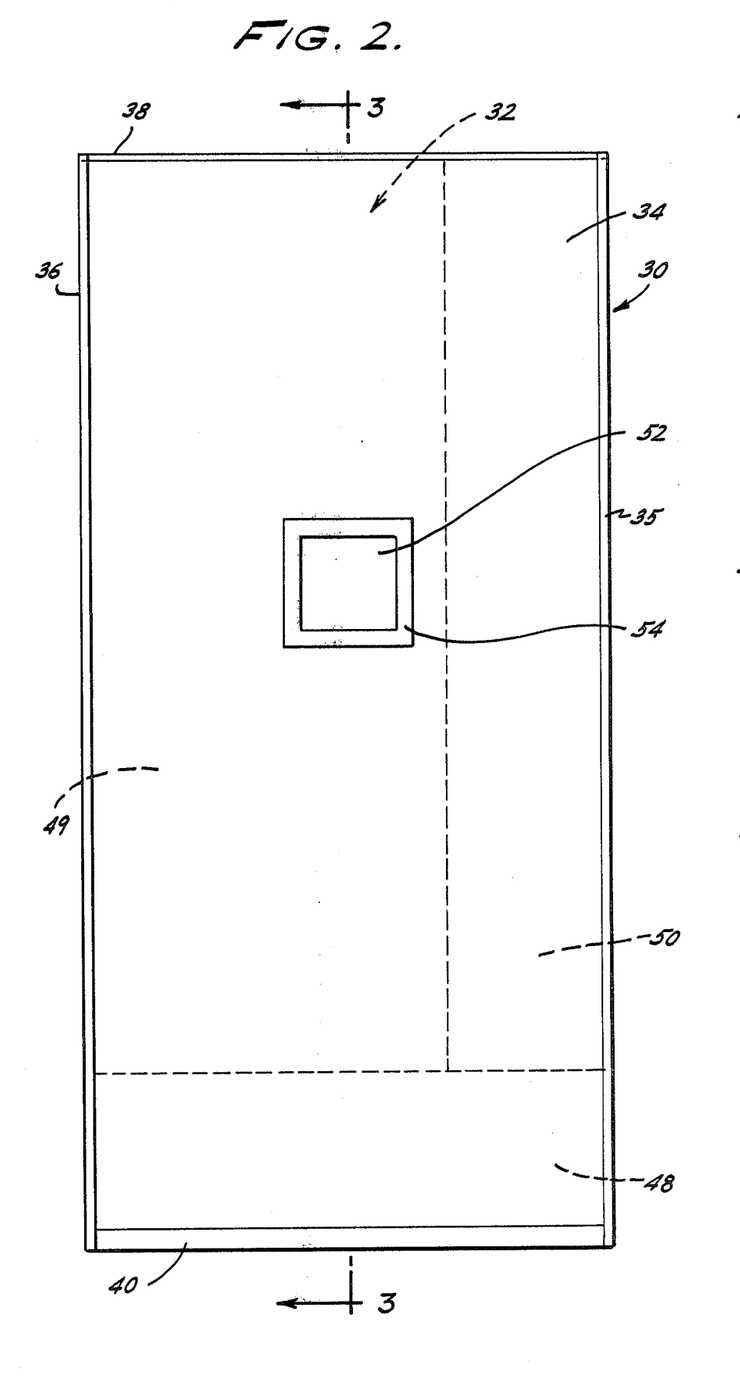
FIG. 2 is an elevational view of a fire door of the present invention.
Figure 3:
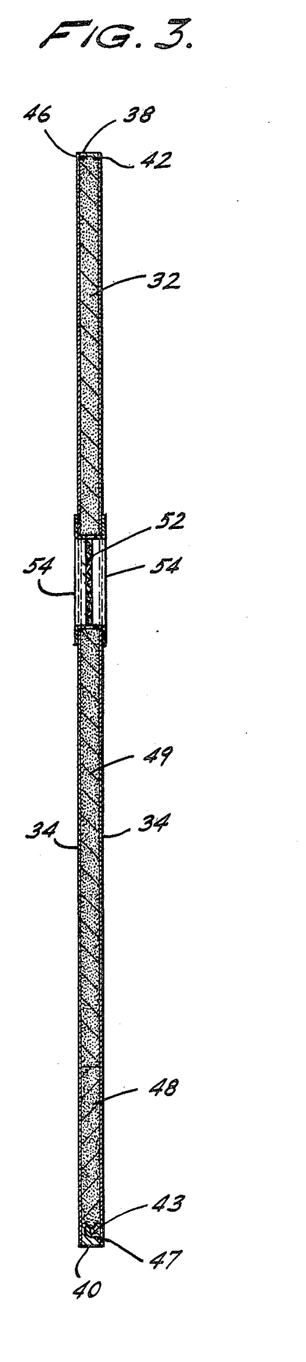
FIG. 3 is a vertical sectional view taken on the line 3—3 of FIG. 2.

FIGS. 2 and 3 are illustrative of a fire door including a core of the present invention. The door 30 includes a core 32 and veneer 34 adhered to both faces of the core. The veneer may be, for example, wood or plastic. The door also includes edge banding adhered to the surface edges of the core, the edge banding comprising stiles 35 and 36, top rail 38 and bottom rail 40. The edge banding may be, for example, wood or plastic.

The edges of the core are shaped to provide projecting tongues which interlock with mating grooves formed on the inside surfaces of the stiles 35 and 36, top rail 38 and bottom rail 40, as exemplified by the tongues 42 and 43 and grooves 46 and 47 in FIG. 3. Alternatively, the edges of the core may be grooved to interlock with mating tongues provided on the stiles and rails.

The veneer 34, stiles 35 and 36, top rail 38, and bottom rail 40 are bonded to the core by a suitable adhesive.

Although the door core may consist of a single piece of the set material, the core 32 of door 30 comprises several pieces of the core as indicated in FIG. 2 by the dotted lines which show 3 core sections, namely, bottom section 48 and upright sections 49 and 50. The edge surfaces of the sections are bonded by a suitable adhesive (not shown). Alternatively, they may be provided with tongues and grooves so that they can be assembled in interlocking relationship. While there are commercial demands for fire doors of varying size, the most widely used fire doors at present include cores about 3'×7'. FIG. 2 can be considered illustrative of how core pieces can be assembled to make a core of larger size (for example, 4'×8') from a core prepared in a 3'×7' mold. Assembling the core from several core pieces avoids the need of having molds of different sizes and of having separate assembly lines for manufacture of the core.

The center region of the door 30 is provided with a glass light 52 surrounded by frame 54. Typically, ¼" thick wire reinforced glass is used and the frame comprises pressed steel.

EXAMPLE

The following example is illustrative of the practice of the present invention.

A fire door core was prepared from a mixture of the following ingredients:

| Ingredients | Amount, weight percent |
| --- | --- |
| expanded perlite | 55.2 |
| calcined gypsum (CaSO$_4$ . ½H$_2$O) | 24.8 |
| Portland cement (Type III) | 12.4 |
| polyvinyl alcohol | 3.2 |
| unexpanded vermiculite | 2.1 |
| clay | 2.1 |
| glass fibers | 0.2 |

The expanded perlite was of the type generally referred to as cryogenic grade and had a compressibility of 93 lb/sq.". a density of 6.5 lb/cu.' and a particle size as follows.

| Mesh (U.S. Standard Sieve Series) | % Retained |
| --- | --- |
| 30 | 24 |
| 50 | 73 |
| 100 | 93.5 |

The polyvinyl alcohol was substantially fully hydrolyzed polyvinyl acetate sold under the trademark Elvanol 90–50 G and comprised polyvinyl alcohol having a bulk density of about 26 lbs/cu.' and a specific gravity of about 1.3. The vermiculite was high grade comminuted vermiculite (Grade BO-4). The clay utilized was finely ground kaolin having an average particle size of less than 2.5 microns. The glass fibers were chopped glass fibers having a length of about ⅜".

The fire door core was prepared in substantially the same manner as described in connection with the description of the process shown in FIG. 1. Thus, the gypsum, Portland cement, vermiculite, clay and glass fibers were mixed initially and then fed to another mixer into which there also was fed perlite and a solution of polyvinyl alcohol. The polyvinyl alcohol solution was prepared by adding about 6 wt. % of powdered polyvinyl alcohol to water at about room temperature and then dissolving the polyvinyl alcohol therein by adding live steam to the mixture of polyvinyl alcohol and water. The water of the polyvinyl alcohol solution was also the source of the water for effecting the setting of the calcined gypsum and the Portland cement. The water comprised about 58% of the weight of the mixture of dry ingredients.

Mixing of all of the ingredients produced a damp granular mixture which was poured into a 3'×7' mold and leveled. The mixture was then compressed to about one-third of its volume and to a thickness of about 1 9/16" with the ram of a press under a pressure of about 100 psi which was applied for about 20 seconds.

Immediately after compressing the mixture into the core, it was hand lifted out of the mold and placed in an oven having a temperature of about 250° F. to set and dry. The core was removed from the oven after about 8 hours. The dried core was then sanded to a uniform thickness of 1½". The set core had a compressive strength of about 300 psi and a dry density of about 26 lbs/cu.ft.

The core material was used to assemble a door of the type shown in FIGS. 2 and 3. The dimensions of the core of the door were 46 15/16"×93¾"×1½", with the upright core sections being 32 15/16"×79¾" and 14"×79¾", and the bottom section being 46 15/16"×14". The grooved edge banding which comprised the stiles and the top and bottom rails was chemically impregnated and grooved soft maple. The stiles were ⅝" by 1½", the top rail was ⅝"×1½" and the bottom rail was 1⅜"×1½". The glass light was 10"×10"×¼" wired glass. The light frame was pressed steel having an inside dimension of 9"×9" and an outside dimension of 11½"×11½". The veneer on either side of the door was ⅛" untreated mahogany plywood. The edge banding and veneer were adhered to the core and the mating edges of the core sections were joined by a water-based polyvinyl emulsion type adhesive.

The above described fire door was subjected to door assembly, fire endurance test ASTM E 152-73. Particulars regarding the frame into which the door was hung are as follows: frame pieces—16 gauge (0.016") pressed steel sold under the trademark Fenestra, style—welded up, hinged right, side; anchors—4 steel straps (0.073") per jamb. The door assembly included a standard U.L. listed latchset and heavy duty hinges.

The time of exposure of the door assembly to the fire was 1 hour.

The door assembly, including the core of the present invention as described above, met the conditions of acceptance of the fire test.

In summary, it can be said that the above-described development affords the means for producing a product having excellent fire resistant properties and also other important properties of the type related to the manufacture, installation and service of a fire resistant door. It is believed that the set composition of the present invention will be used most widely as fire door cores in standard, popularly used sizes, such as cores having a thickness of about 1½" and rectangular dimensions of about 3'×6'8", 3'×7' and 4'×8'. However, it should be understood that the set composition can be used in other applications such as, for example, fireproofing of steel beams and columns, fire resistant partitions, pipe insulation, fire rated safes and storage cabinets.

We claim:

1. A method for making a fire door core from a mixture of materials including a compressible filler, which method comprises dry premixing particulate hydraulic cement and calcined gypsum, intermixing said premixed ingredients with a particulate compressible filler, organic binder and water, said filler being prexpanded compressible perlite of density less than about 6.5 lb./cu. ft., the weight quantities of cement, gypsum, perlite and binder in the mixture being:

| cement | 10–20% |
|---|---|
| gypsum | 10–30% |
| perlite | 50–70% |
| binder | 1–5%; | and the quantity of water being in excess of the stoichiometric amount needed to hydrate the cement and gypsum and sufficient to provide a damp mixture but less than the amount which would produce an aqueous slurry of the intermixed ingredients, placing a charge of the damp mixture in a pressure mold of slab form, applying sufficient pressure to the damp charge in the mold to compress the charge to about 25% to 33% of its original volume and maintaining the pressure until the compression strength of the compressed charge is at least about 50 psi, removing the molded slab from the mold and thereafter drying the slab by heating it sufficiently to remove excess water, and forming a fire door core piece from the dried slab.

2. A method as defined in claim 1 in which the binder is polyvinyl alcohol.

3. A method as defined in claim 1 in which the intermixed ingredients further include unexpanded vermiculite in an amount not greater than about 4 wt. % of the dry ingredients.

4. A method as defined in claim 1 in which the intermixed ingredients further include clay in an amount not greater than about 4 wt. % of the dry ingredients.

5. A method as defined in claim 1 in which the intermixed ingredients further include fibrous reinforcements in an amount not greater than about 1 wt. % of the dry ingredients.

6. A method for making a fire door core comprising dry premixing particulate hydraulic cement, calcined gypsum, unexpanded vermiculite, clay and fibrous reinforcements, intermixing said premixed ingredients with a particulate compressible filler, organic binder and water, said filler being preexpanded compressible perlite of density less than about 6.5 lb./cu. ft., the weight quantities of cement, gypsum, vermiculite, clay, reinforcements, perlite and binder in the mixture being:

| cement | 10–20% |
|---|---|
| gypsum | 10–30% |
| vermiculite | 0–4% |
| clay | 0–4% |
| reinforcements | 0–1% |
| perlite | 50–70% |
| binder | 1–5%; | and the quantity of water being in excess of the stoichiometric amount needed to hydrate the cement and gypsum and sufficient to provide a damp mixture but less than the amount which would produce an aqueous slurry of the intermixed ingredients, placing a charge of the damp mixture in a pressure mold of slab form, applying sufficient pressure to the damp charge in the mold to compress the charge to about 25% to 33% of its original volume and maintaining the pressure until the compression strength of the compressed charge is at least about 50 psi, removing the molded slab from the mold and thereafter drying the slab by heating it sufficiently to remove excess water, and forming a fire door core piece from the dried slab.

7. A method for making a fire door core comprising dry premixing particulate hydraulic cement, calcined gypsum, unexpanded vermiculite, clay and fibrous reinforcements, intermixing said premixed ingredients with a particulate compressible filler, organic binder and water, said filler being preexpanded compressible perlite of density less than about 6.5 lb./cu. ft., the weight quantities of the ingredients of the mixture being:

| cement | 10–15% |
|---|---|
| gypsum | 20–25% |
| perlite | 50–55% |
| binder | 1.5–5% |
| vermiculite | 1.5–4% |
| clay | 1.5–4% |
| reinforcements | 0.2–1% |
| water | 25–60% of the weight of the other ingredients | and the quantity of water being in excess of the stoichiometric amount needed to hydrate the cement and gypsum and sufficient to provide a damp mixture but less than the amount which would produce an aqueous slurry of the intermixed ingredients, placing a charge of the damp mixture in a pressure mold of slab form, applying sufficient pressure to the damp charge in the mold to compress the charge to about 25% to 33% of its original volume and maintaining the pressure until the compression strength of the compressed charge is at least about 50 psi, removing the molded slab from the mold and thereafter drying the slab by heating it sufficiently to remove excess water, and forming a fire door core piece from the dried slab.

* * * * *

UNITED STATES PATENT AND TRADEMARK OFFICE
CERTIFICATE OF CORRECTION

PATENT NO. : 4,159,302
DATED : June 26, 1979
INVENTOR(S) : Dale R. Greve & Turner W. Richards It is certified that error appears in the above-identified patent and that said Letters Patent are hereby corrected as shown below:

Col. 4, line 21, "wise" should be --wide--.

Col. 5, in Table 1, the heading for the last column should be changed from "Density, 16/cu. ft." to --Density, lb/cu. ft.--.

Signed and Sealed this

Thirteenth Day of November 1979

[SEAL]

Attest:

RUTH C. MASON
Attesting Officer

LUTRELLE F. PARKER
Acting Commissioner of Patents and Trademarks